Patented Aug. 30, 1927.

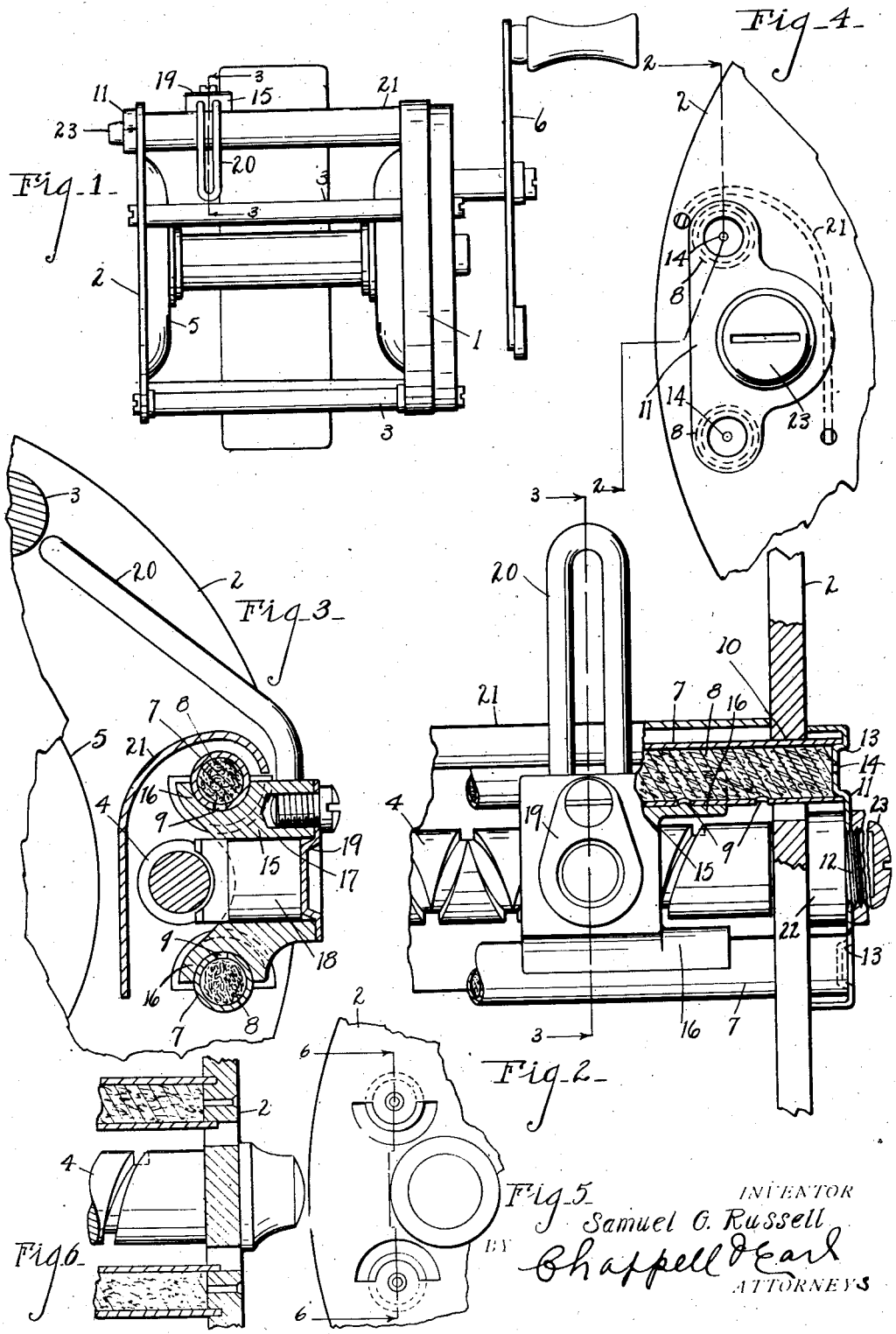

1,640,375

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

FISHING REEL.

Application filed September 25, 1926. Serial No. 137,789.

The main object of this invention is to provide an improved fishing reel of the level wind type in which the line guide carriage is supported by ways so that it travels freely, is not likely to bind in its movement and at the same time has a close bearing engagement with the ways.

A further object is to provide a fishing reel having these advantages in which the bearing surfaces are effectively lubricated.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a plan view of a fishing reel embodying the features of my invention.

Fig. 2 is a fragmentary view partially in section on a line corresponding to line 2—2 of Fig. 4.

Fig. 3 is a fragmentary section on a line corresponding to line 3—3 of Figs. 1 and 2.

Fig. 4 is a fragmentary end view looking from the right of Fig. 2.

Referring to the drawing, the frame of my improved fishing reel in the embodiment illustrated comprises head members 1 and 2, the head member 2 being sometimes designated as a tail-plate. These members 1 and 2 are connected by the pillars 3 as is well-known practice.

A reversely threaded traversing shaft 4 is journaled in the frame and it and the spool 5 have suitable driving connections to the crank 6. As gear trains for connecting spools and traversing shafts to gears are well-known in the art and form no part of this invention, the gear train is not illustrated herein.

On opposite sides of the traversing shaft 4 I mount tubular way members 7, these way members being preferably sections of steel or other tubing suitable to provide bearing surfaces and filled with fibrous material 8 adapted to retain lubricant, allowing it to gradually escape through the openings 9 in the faces of the way members. In the embodiment illustrated these way members are arranged to extend through openings 10 in the frame member 2 and are retained therein by the plate 11, having inwardly struck bosses 13 which engage in the ends of the way members, as shown in Fig. 2.

In the embodiment illustrated, openings 14 are provided in the plate 11 for the introduction of lubricant. The plate 11 is provided with an opening to receive the threaded stud on the shaft bearing 22 and is clamped against the end of the bearing by the cap 23.

The carriage 15 has bearing members 16 coacting with the ways and a bore-like socket 17 disposed centrally between the bearings to receive the pawl 18, supporting it in operative relation to the traversing shaft, the pawl retaining member 19 being secured upon the carriage to overlap the socket, it having an inset boss engaging the end of the pawl.

The line guide eye 20 projects upwardly in front of and is deflected rearwardly to overhang the housing 21, the upper end of which overhangs the upper way. The end of the line guide eye lies adjacent one of the pillars.

My improved fishing reel is quite simple and economical in structure. The carriage moves freely and is efficiently lubricated.

Having thus described my invention what I claim as new and desire to secure by Letters Patent is:

1. In a fishing reel, the combination of a frame, a traversing shaft, tubular way members disposed on opposite sides of said traversing shaft and provided with lubricant openings on their inner sides, said way members having a lubricant retaining material therein and being disposed with their ends projecting through the frame, a line guide carriage provided with bearing members coacting with said ways and with a pawl coacting with said traversing shaft, and a retaining plate on said frame engaging the ends of said way members and provided with apertures through which oil may be introduced to said way members.

2. In a fishing reel, the combination of a frame, a traversing shaft, tubular way members disposed on opposite sides of said traversing shaft and provided with lubricant openings on their inner sides, said way members having a lubricant retaining material therein, and a line guide carriage provided with bearing members coacting with said ways and with a pawl coacting with said traversing shaft.

3. In a fishing reel, the combination of a frame comprising a head member having openings therein, a traversing shaft, tubular way members adapted as lubricant retainers disposed with their ends projecting through said openings in said frame head member, a line guide carriage operatively associated with said traversing shaft and provided with bearing members coacting with said way members, and a retaining plate mounted on said head member to engage the ends of said way members.

4. In a fishing reel, the combination of a frame comprising a head member having openings therein, a traversing shaft, tubular way members adapted as lubricant retainers disposed with their ends projecting through said openings in said frame head member, and a line guide carriage operatively associated with said traversing shaft and provided with bearing members coacting with said way members.

5. In a fishing reel, the combination with a frame, of a traversing shaft, a hollow way member adapted as a lubricant retainer, and a line guide carriage provided with a bearing member coacting with said way, said way having an oil opening in its bearing face.

6. In a fishing reel, the combination with a frame, of a traversing shaft, a hollow way member adapted as a lubricant retainer, and a line guide carriage provided with a bearing member coacting with said way.

7. In a fishing reel, the combination with the frame comprising a head member having openings therein and a shaft bearing disposed adjacent said openings, said shaft bearing having a threaded stud projection, a traversing shaft disposed in said bearing, way members disposed with their ends projecting through said openings in said head member, a retaining plate engaging the ends of said way members, having an opening to receive said stud on said bearing, a nut threaded upon said stud to clamp said plate, and a line guide carriage operatively associated with said traversing shaft and provided with bearing members coacting with said way members.

In witness whereof I have hereunto set my hand.

SAMUEL G. RUSSELL.